United States Patent
Gershony

(10) Patent No.: US 6,763,144 B1
(45) Date of Patent: Jul. 13, 2004

(54) HALFTONE IMAGE REPRODUCTION

(75) Inventor: Moshe Gershony, Kfar Sava (IL)

(73) Assignee: Creo IL, Ltd., Herzlia (IL)

( * ) Notice: Subject to any disclaimer, the term of this patent is extended or adjusted under 35 U.S.C. 154(b) by 638 days.

(21) Appl. No.: 09/585,123

(22) Filed: Jun. 1, 2000

(51) Int. Cl.⁷ .................................................. G06K 9/40
(52) U.S. Cl. ..................... 382/274; 358/3.06; 358/3.23; 358/3.3; 358/536; 382/112; 382/163; 382/218
(58) Field of Search ................................. 345/596–602; 347/251, 252; 358/3.06–3.1, 3.23, 3.3, 533–536; 382/112, 169, 176

(56) References Cited

U.S. PATENT DOCUMENTS

| | | | |
|---|---|---|---|
| 4,350,996 A | 9/1982 | Rosenfeld | 358/75 |
| 4,456,924 A | 6/1984 | Rosenfeld | 358/75 |
| 5,067,025 A * | 11/1991 | Kitagawa | 358/3.2 |
| 5,243,443 A * | 9/1993 | Eschbach | 358/3.03 |
| 5,444,551 A | 8/1995 | Miller et al. | 358/456 |
| 5,696,604 A * | 12/1997 | Curry | 358/3.02 |
| 5,831,626 A * | 11/1998 | Sano et al. | 345/596 |
| 6,226,104 B1 * | 5/2001 | Shiomi et al. | 358/1.9 |
| 6,266,079 B1 * | 7/2001 | Gershony et al. | 347/251 |

FOREIGN PATENT DOCUMENTS

EP        0 580 151 A2    1/1994

* cited by examiner

Primary Examiner—Bhavesh M. Mehta
Assistant Examiner—Gregory Desire
(74) Attorney, Agent, or Firm—Darby & Darby

(57) ABSTRACT

Method and apparatus for performing halftoning of an image, using two 2-dimensional look up tables (LUTS). The first LUT receives coordinates of an image value and outputs a screen reference value which then serves, together with the image value as address for the second LUT. The output of the second LUT is the halftone value.

21 Claims, 15 Drawing Sheets

HALFTONE IMAGE REPRODUCTION

FIELD OF THE INVENTION

The present invention relates to methods and apparatus for producing a halftone (screened) reproduction of a latent or real image from a digital representation of a black and white or color image by an output device used in the printing and pre-printing industry.

BACKGROUND OF THE INVENTION

Halftone is the reproduction of continuous tone art work, such as a photograph, through a series of dots of various sizes and locations used to simulate grays or color tones.

In general, digital halftoning is accomplished by either binary (1 bit—two levels) or multi-bit (multi-level) halftoning methods. In binary digital halftoning, a continuous tone image is converted into a halftone image consisting of a pattern of dots. Each dot within the halftone image is either "ON" (black) or "OFF" (white). More specifically, binary digital halftoning converts a plurality of digitized intensity values representing a continuous tone image into a plurality of halftone cells, each halftone cell corresponding to an intensity value. The number of dots within each halftone cell is proportional to the magnitude of each corresponding intensity value.

During binary digital halftoning, each intensity value is spatially mapped into a corresponding halftone cell, having a plurality of black and white dots.

In operation, a binary digital halftoning system compares each intensity value to a matrix of threshold levels and generates a halftone cell corresponding to each intensity value. Typically, the threshold matrix has a number of elements equivalent to the number of dots in the halftone cell. To generate the binary halftone cell, a given intensity value is compared to each threshold level in the matrix. Each dot in the halftone cell, that corresponds to a threshold level in the threshold level matrix that is lesser in value than the intensity value, is made black; otherwise, the dot is white. Thus, the intensity value is mapped into an area comprised of an arrangement of black and white dots whose overall intensity is corresponding to the magnitude of the intensity value.

Multi-level halftoning is an extension of binary halftoning. In multi-level halftoning, each dot in the halftone cell has a multi-bit value. Many display devices, some digital printing devices and other marking devices permit multi-level pixel reproduction; multi-level halftoning takes advantage of this capability.

Typically, these devices are limited as to the number of levels that they can produce. In contrast, sampling devices can produce many different output levels. Multi-level halftoning is used to convert a large number of tone levels into a lesser number of levels. For instance, if a display device can accurately display sixteen levels while a scanner can provide a 256 level intensity value, a multi-level halftoning system must distribute each single 256 level value into a halftone cell containing a plurality of sixteen level dots, so that, when viewed, will appear as the 256 level value.

Reference is now made to FIG. 1, which is a schematic block diagram of a prior art halftoning technique, as described in U.S. Pat. Nos. 4,350,996 and 4,456,924 assigned to Scitex Corp. Ltd. This halftoning technique is very well known and many vendors such as AGFA, Linotype-Hell, Dainippon Screen etc. have used different versions of it. Screen threshold values are pre-calculated and stored in a screen threshold value matrix 30—a memory that can be described as a two-dimensional array or matrix. The screen threshold values may be stored permanently, or calculated specifically according to some required parameters defined for a specific job. In either case, the screen threshold values should be stored in the screen threshold value matrix 30 prior to the beginning of the screening (halftoning) process.

During the screening process, screen threshold values are compared, by means of a comparator 60, with image data, temporarily stored in the image value buffer 40. During halftoning, the image data is read from the image value buffer 40 and may be modified, e.g. for calibration purposes, by calibration look-up table 50. In some prior-art embodiments, the calibration LUT 50 may exist in another section of the system, or may not exist at all, and the calibration function is performed by other means.

The output 65 of the comparison performed by the comparator 60 is a binary halftone output, namely, one-bit data that serves as the control for the printing engine. In this case, the printer is capable of either printing a full mark (dot) on the substrate (the halftone output bit is "1" or "ON") or not printing at this point at all (the halftone output bit is "0" or "OFF").

The reading of screen threshold values from the screen threshold value matrix 30 may be sequential, value by value and line by line. In such a case, the address calculator 20 performs as a simple count-up counter. There may, however, be more complex address calculations performed by address calculator 20, including skipping of cells in the screen threshold value matrix, or even more complex address calculations such as angled scanning of the matrix. In case of an angled scanning of the matrix 30 cells, the resulting output halftone image will be a screened (halftone) reproduction that composes an angled screen.

Typically, image values and screen threshold values are each represented by an eight bit digital number. The halftone output, however, is a one-bit number. The number of bits that compose the X address-coordinate 25 and Y address-coordinate 35 may vary, depending on the size of the matrix 30. A typical small matrix 30 of 16 by 16 entries may be addressed by a four-bit number for the X address-coordinate 25 and another four-bit number for the Y address-coordinate 35. A large but still typical matrix 30 may be composed of a 1024 by 1024 two-dimensional array, addressed by ten bit numbers for each of the X and Y address-coordinates. Such a large matrix 30 is capable of representing a very accurate and sophisticated halftone cell or a combination of a number of halftone cells in a super cell arrangement. For a super cell arrangement, even a large matrix 30 of 4096 by 4096 entries may be considered. For such a matrix, a 12-bit number is required for each of the X and Y address-coordinates.

FIG. 2 is a simplified example of the arrangement and data composition of the screen threshold value matrix 30 of FIG. 1. In this simplified example, the matrix 30 is composed of entries 70 in a two-dimensional five by five array. The content of the entries is designed to reproduce a typical square halftone dot. Different contents of the entries 70 will result in different shapes of the output halftone dot. It should be noted that the shapes of the various output halftone dots are a representation of the matrix 30 contents, and a larger image value results in a larger size of the output halftone pixel, since it comprises a larger number of "ON" dots.

FIGS. 3A and 3B illustrate, by way of example, the output halftone pixels corresponding to intensity values of 10 and 20 respectively, using the threshold matrix of FIG. 2. In these examples, the matrix contents dictates square dots of a size proportional to the input intensity value.

FIG. 4 schematically illustrates another prior art screening method, as described in U.S. Pat. No. 5,444,551 assigned to Eastman Kodak Company. The method presented is a generalized method for providing a mechanism for performing multi-level half-toning of continuous tone images.

In this prior art system, various dot arrangements are defined and associated with all possible image values. These dot arrangements are stored in a plurality of two-dimensional arrays. A typical variety of 256 different image values requires 256 arrays for storing all possible dot arrangements. The entire halftoning system may be described as a three-dimensional array (memory) in which the X and Y axes correspond to the X and Y axes on the printed media, and the Z (height) axis corresponds to the image value at a location in the XY plane. In this embodiment, output may be a one bit, or multi bit, depending on the number of bits assigned for each location in the three-dimensional memory.

During the halftoning process, each (x, y) location on the printed media is transformed to its relative (x', y') location within the three-dimensional halftoning array. The calculated x' and y', together with the image intensity value, compose an address to a memory cell within the three-dimensional array. The data obtained from this cell is the output halftone data.

It should be noted that this embodiment enables completely different dot arrangements and sizes for different image intensity values, since a separate matrix is assigned to each intensity value. For example, for a specific image value the dot shape may be round, with dot coverage of 40%, for the next image value the dot may be a star, with coverage of 90% and the next image value may result in a dispersed "random" arrangement with 50% coverage. This embodiment is, therefore, much more flexible than the embodiment of FIG. 1, where a single threshold matrix serves for all image values, determining a similar dot arrangement, as illustrated in FIGS. 2, 3A and 3B. The "penalty" in using the embodiment of FIG. 4 may be the need for a large memory. For example, a matrix 30 of FIG. 1, of 1000 by 1000 cells requires 1 Mbytes (one million memory cells). A corresponding memory size constructed for the embodiment of FIG. 4 requires 32 Mbytes for one bit halftone output, or 128 Mbytes for four-bit halftone output. In applications that use smaller arrays for storing the various dot arrangements, the overall memory size may be "reasonable". For example, 256 dot arrangements of 64 by 64 cells, with four-bit output halftone, require 0.5 Mbytes. It should also be noted that most industrial embodiments do not use this method, and that the embodiment of FIG. 1 is much more common.

SUMMARY OF THE INVENTION

According to the invention, a new approach is adopted regarding the definition of the halftoning values.

An aspect of the invention is a method for determining said values, which comprises the steps of:
  providing pairs of image coordinates defining addresses in a digital image;
  deriving from each said coordinate pair a screen reference value;
  providing the digital intensity values of said digital image corresponding to said address-coordinates; and
  deriving a halftone value from each image intensity value and the corresponding screen reference value.

The term "address" is used in this specification and claims, unless otherwise stated, in a geometrical sense, viz. to indicate a point or location in an image or in a part thereof.

Screen reference values are digital values, each of which is derived from an address as defined above.

By "screen reference value corresponding" to a image intensity value is meant the screen reference value defined for the image address to which said image value corresponds.

A first transformation module is preferably used to derive from each said coordinate pair a screen reference value, and a second transformation module is preferably used to derive a halftone value from each image intensity value and the corresponding screen reference value.

The first and second transformation modules may each be a two-dimensional matrix or a LUT or a calculator, operable to perform arithmetic operations.

In embodiments of the invention, the said digital image intensity values may be calibrated before feeding them to said second transformation module.

Another aspect of the invention is an apparatus for producing a halftone image, which comprises:
  storage means for storing digital image intensity values, each corresponding to an image address, viz. to a pair of image coordinates;
  first transformation means for receiving image coordinates and deriving therefrom a screen reference value for each said address; and
  second transformation means for receiving said screen reference values from said first transformation means, receiving from said storage means corresponding digital image values, and deriving a halftone value from each reference value and the corresponding digital image value.

The first and second transformation means may each be a two-dimensional matrix, a LUT or a calculator, operable to perform arithmetic operations.

In embodiments of the invention, the apparatus may comprise calibration means for receiving the digital image values and providing modified values to be fed to the second transformation means.

The advantages of the invention can be illustrated by considering the case that both transformation means or modules are LUTs. In this case, rather than use, in effect, a 3D LUT, the present invention describes a re-distribution of the information in such a way as to use two 2D LUTs in series. This leads to a considerable saving of space and computational complexity over prior art methods and apparatus, achieved by discarding redundant screen values. In principle, two 2D LUTs cannot hold all the information that an equivalent 3D LUT holds, and their use may result in loss of some tone values. If, however, the discarded values are redundant ones, then there is no loss of any real information and there will be no degradation whatsoever of screening quality. Redundancy, in the context of the present invention, means that same threshold values exist for a plurality of image addresses, enabling the use of a representative code instead of the actual threshold values.

Also, in practical terms, there is no loss of flexibility and no added complexity. Two 2D LUTs are created, which completely separate the 'geometrical' (X,Y) addressing from the thresholding aspects. The intermediate parameter connecting the two new 2D LUTs is the screen reference value. According to this method, the inputs to the first 2D LUT are the (x, y) parameters and its output is a screen reference value which, in turn, together with an image intensity value, are the input entries to the second 2D LUT.

The output from the second LUT is an N-bit halftone value, where N is an integer with a value greater than or equal to 1.

The redundancy in threshold combinations, namely, the fact that multiple (X,Y) combinations have the same screen reference value, enables this use of two 2D LUTs instead of one 3D LUT.

DETAILED DESCRIPTION OF PREFERRED EMBODIMENTS

Figure 5:
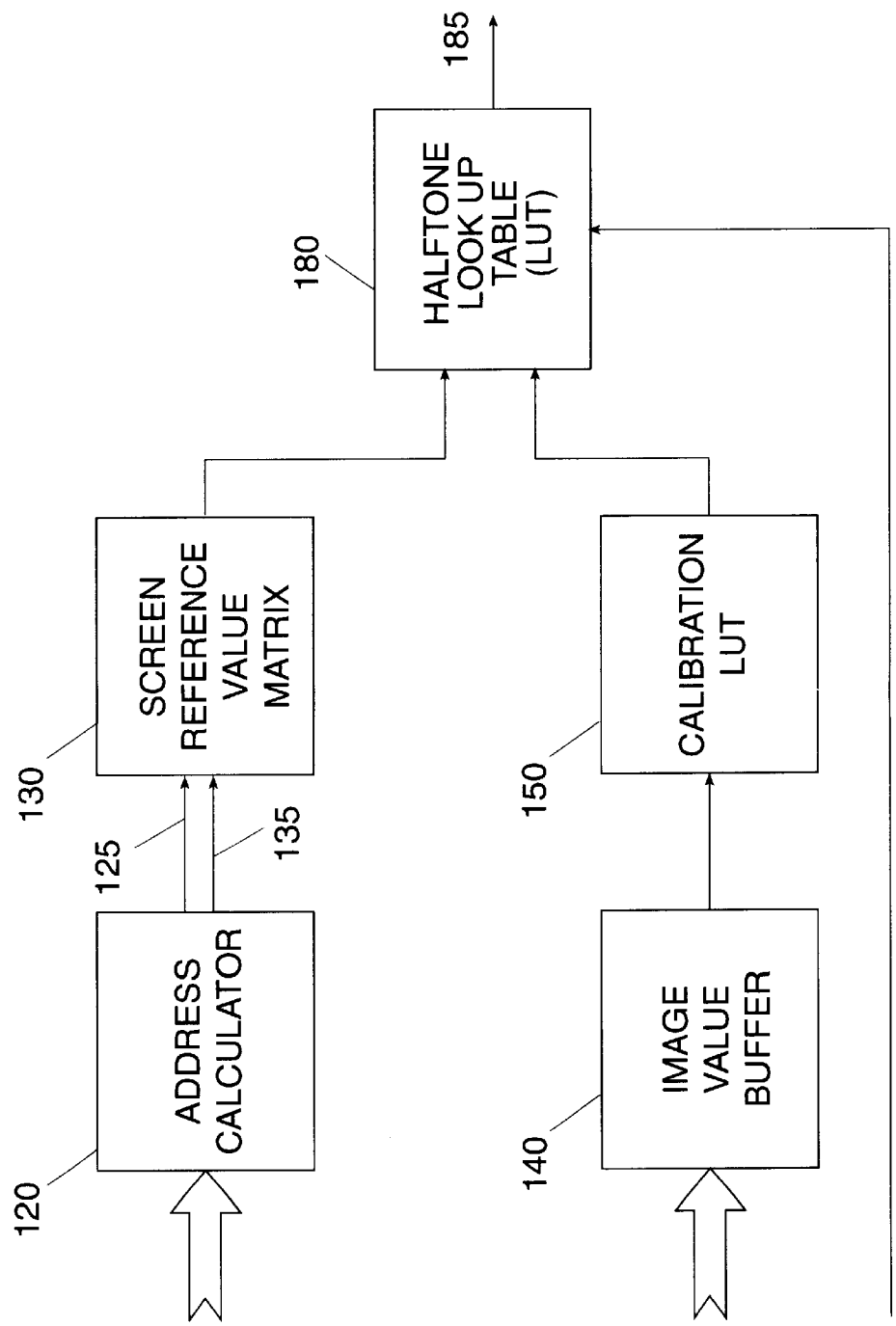
FIG. 5 is a schematic block diagram of a first preferred embodiment of the present invention.

Reference is now made to FIG. 5, which is a schematic block diagram of a first preferred embodiment of the present invention. Address calculator 120, image value buffer 140 and calibration look up table (LUT) 150 are similar to address calculator 20, image value buffer 40 and calibration LUT 50 of FIG. 1, respectively, and their function is also similar. Screen reference value matrix 130, however, is not similar to screen threshold value matrix 30 of FIG. 1.

Screen reference value matrix 130 stores values that are used as reference values in a broader way, in comparison with the way the values of matrix 30 are used. Screen reference value matrix 130 provides screen reference values, each corresponding to a pair of coordinates and therefore to an image address calculated by address calculator 120, which reference values serve as input to halftone LUT 180. Image value buffer 140 with calibration LUT 150 provide image intensity values. The calibration LUT 150 is typically a memory with a number of locations that correspond to the number of possible image intensity values, for example 256. The image value that is read from the image value buffer 140 is used as the address to calibration LUT 150. The data read from the addressed memory location is the modified image value.

In this preferred embodiment of the present invention, the determination of the output halftone data is performed by the halftone look up table (LUT) 180. The novel feature of the system is the ability to determine independently different output halftone data for different combinations of screen reference values and image values. The output halftone data may be pre-calculated according to a plurality of functions that may include subtraction, inverse subtraction, comparison, or other functions, as well as non-functional determination.

Figure 1:
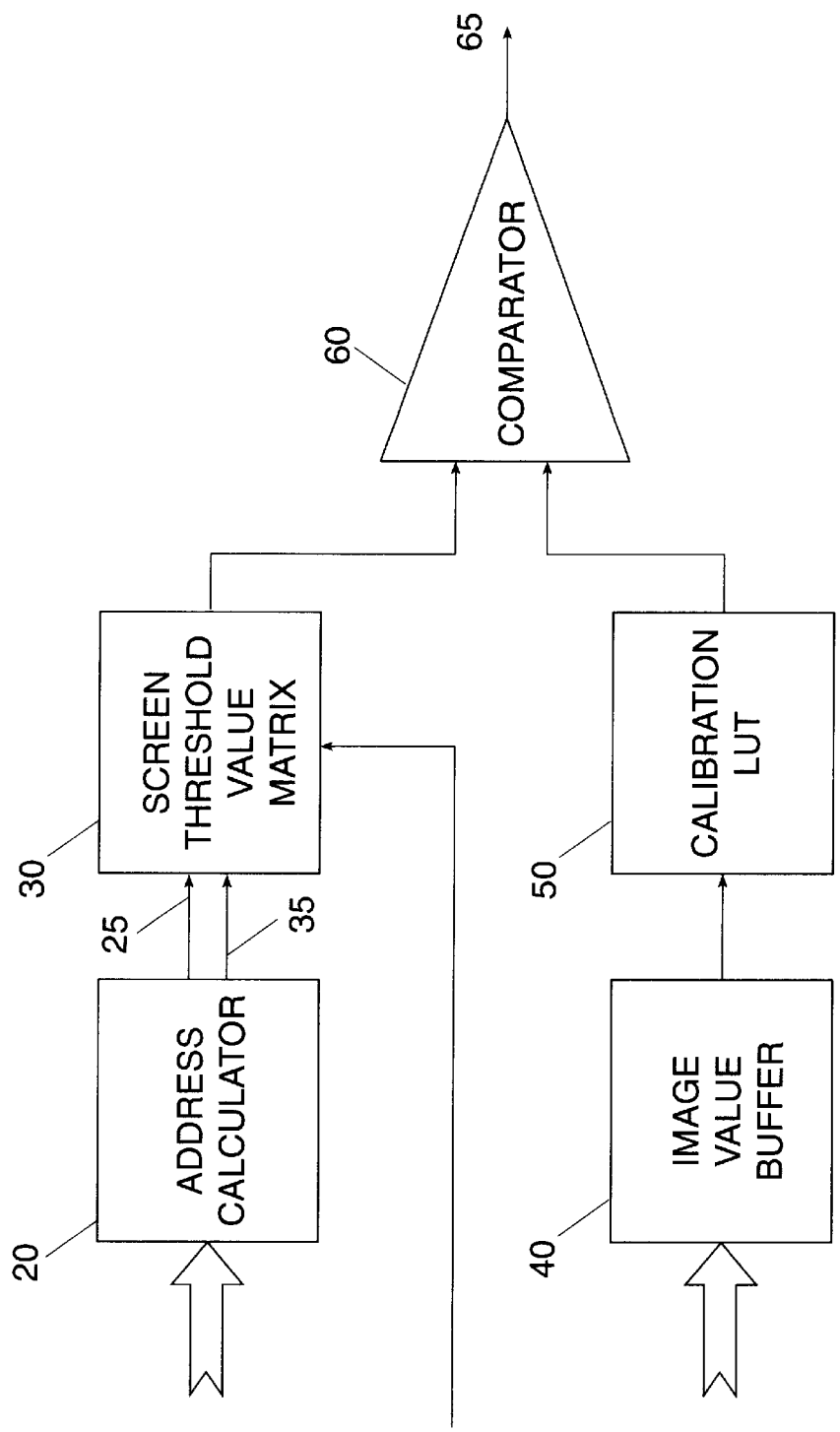
FIG. 1 if a schematic block diagram of a first prior art screening process.
Figure 2:
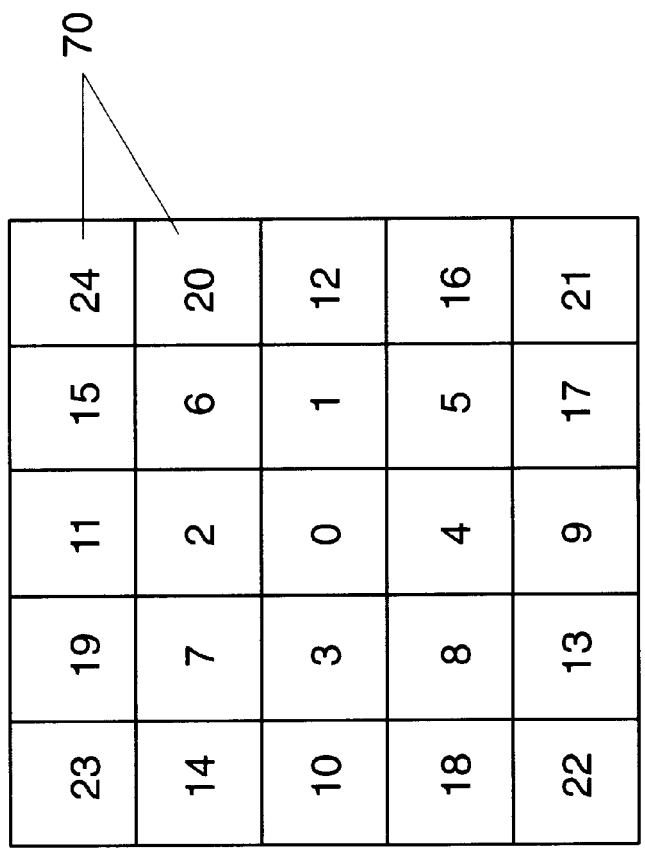
FIG. 2 is a simplified example of a screen threshold value matrix of the prior art of FIG. 1.
Figure 3A:
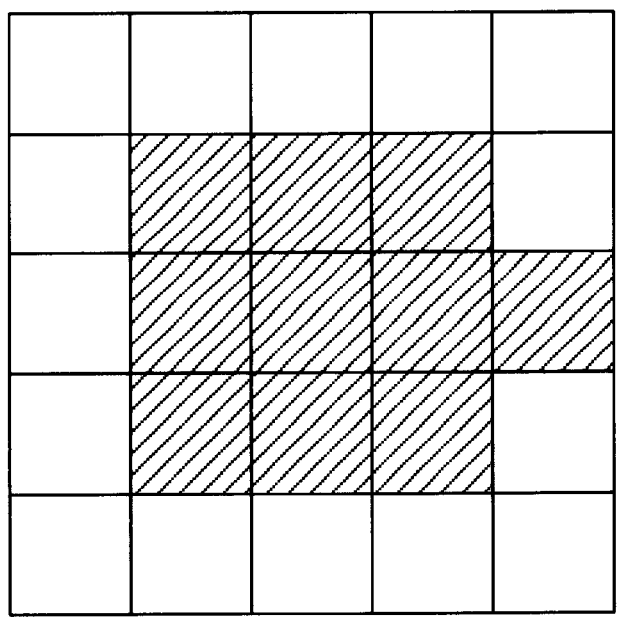
FIGS. 3A and 3B are two examples of halftone dots, created by using the matrix of FIG. 2.
Figure 3B:
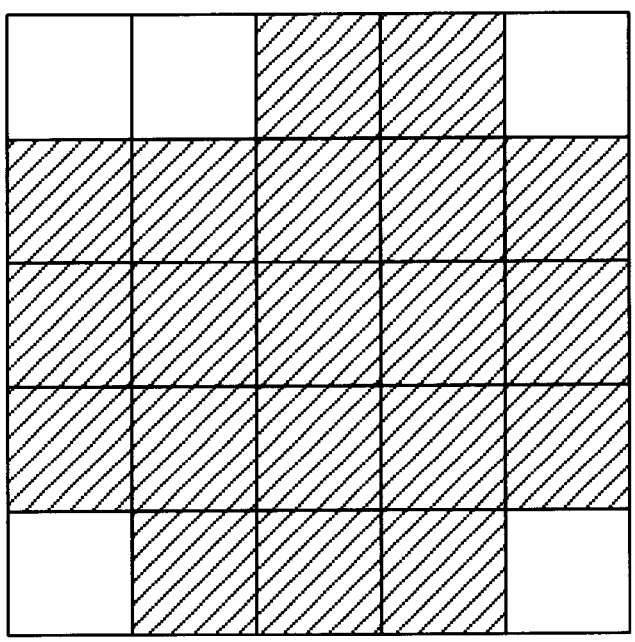

This configuration is therefore much more flexible than the configuration of FIG. 1 that incorporates a fixed function, either comparison or subtraction, for determining the output halftone data. An example for the additional flexibility of the embodiment of FIG. 5 is the ability to define different ranges of image values, or different ranges of screen reference values, for which different functions will be utilized in the halftone look up table 180. As a result, a larger image value may result, for example, in a smaller halftone dot size.

Therefore, it will be understood that the prior art embodiment of FIG. 1 is much less flexible than the embodiment of FIG. 5. However, the embodiment of FIG. 5 is not as flexible as that of FIG. 4, but typically requires less memory, especially when a large screen reference value matrix 130 is required. This is due to the fact that the embodiment of FIG. 4 uses 256 matrices of that size.

Figure 4:
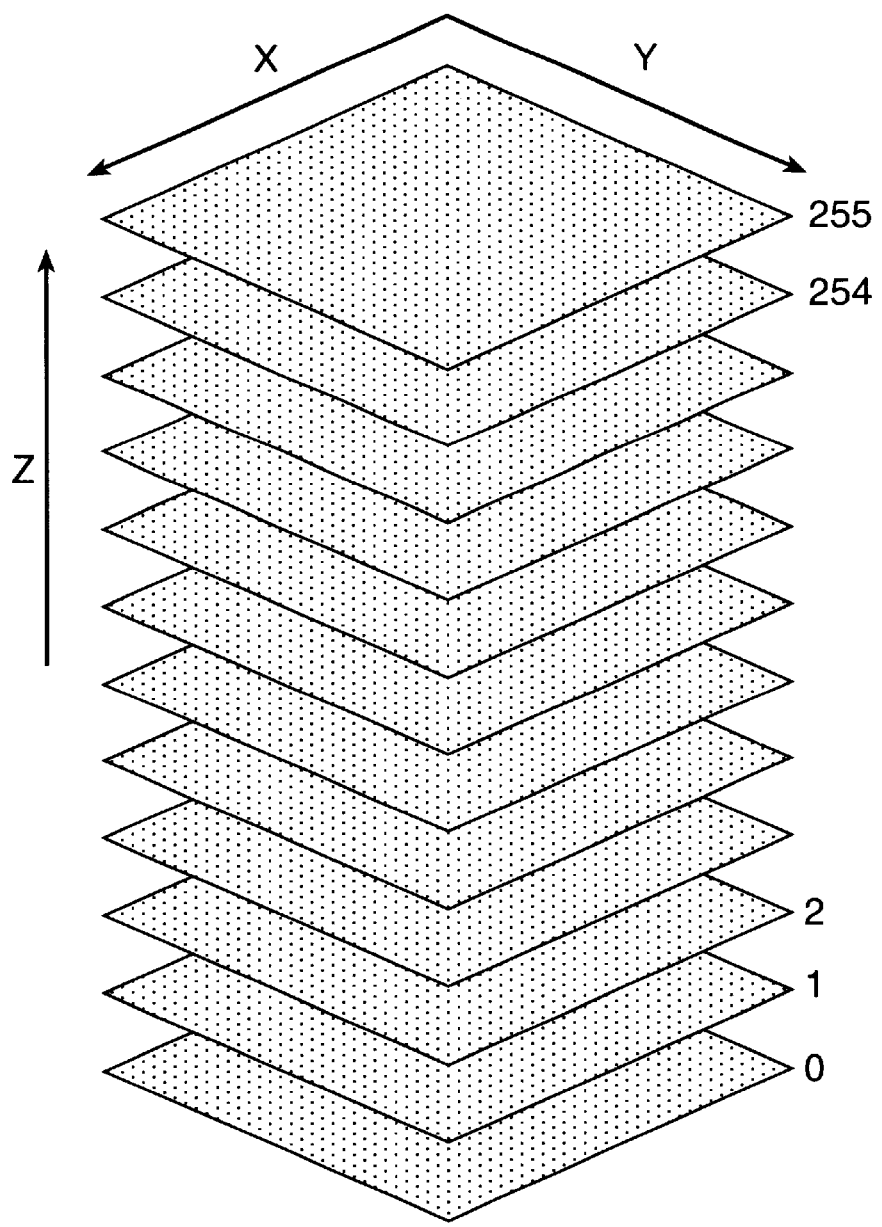
FIG. 4 is a schematic representation of a second prior art.

For example, the three dimensional 1000 by 1000 dot arrangement with four bit output halftone of FIG. 4 requires 128 Mbytes, and in the embodiment of FIG. 5 it will require 1 Mbytes for the two dimensional matrix 130 and 32 Kbytes for LUT 180. Again, it should be noted that for small dot arrays, the configuration of FIG. 4 requires small and reasonable memory size.

Figure 6:
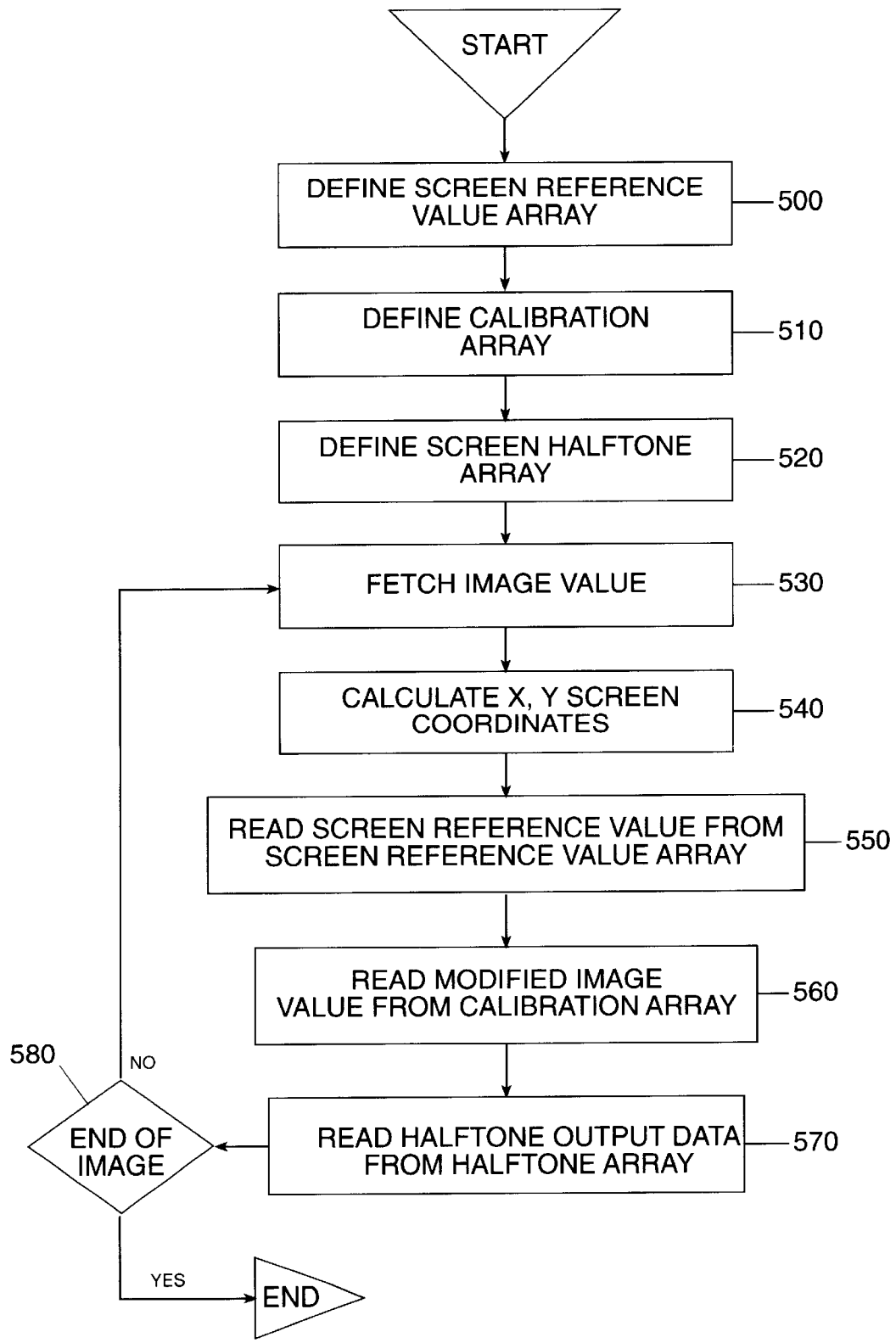
FIG. 6 is a flowchart describing a first software embodiment of the present invention.

Reference is now made to FIG. 6 which is a flowchart describing the operation of the apparatus of FIG. 5. Steps 500, 510 and 520 define the screen reference value array, calibration array and halftone array, respectively. These definitions are made once for each process, and are used for the whole process of halftoning an image. The repetitive process of halftoning starts at step 530, where an image value is being fetched (or read). The x, y screen coordinates, which are the transformation of the image value coordinates to the screen coordinates, are calculated in step 540. These coordinates are used for reading a screen reference value from screen reference value array in step 550. The image value is used as an address for reading a modified (calibrated) image value from calibration array in step 560. The screen reference value from step 550 and the modified image value from step 560 are used in combination as the address for reading a halftone output data from the halftone array in step 570. Step 580 controls the loop and maintains the halftoning process as long as there are image values to be processed.

Figure 7:
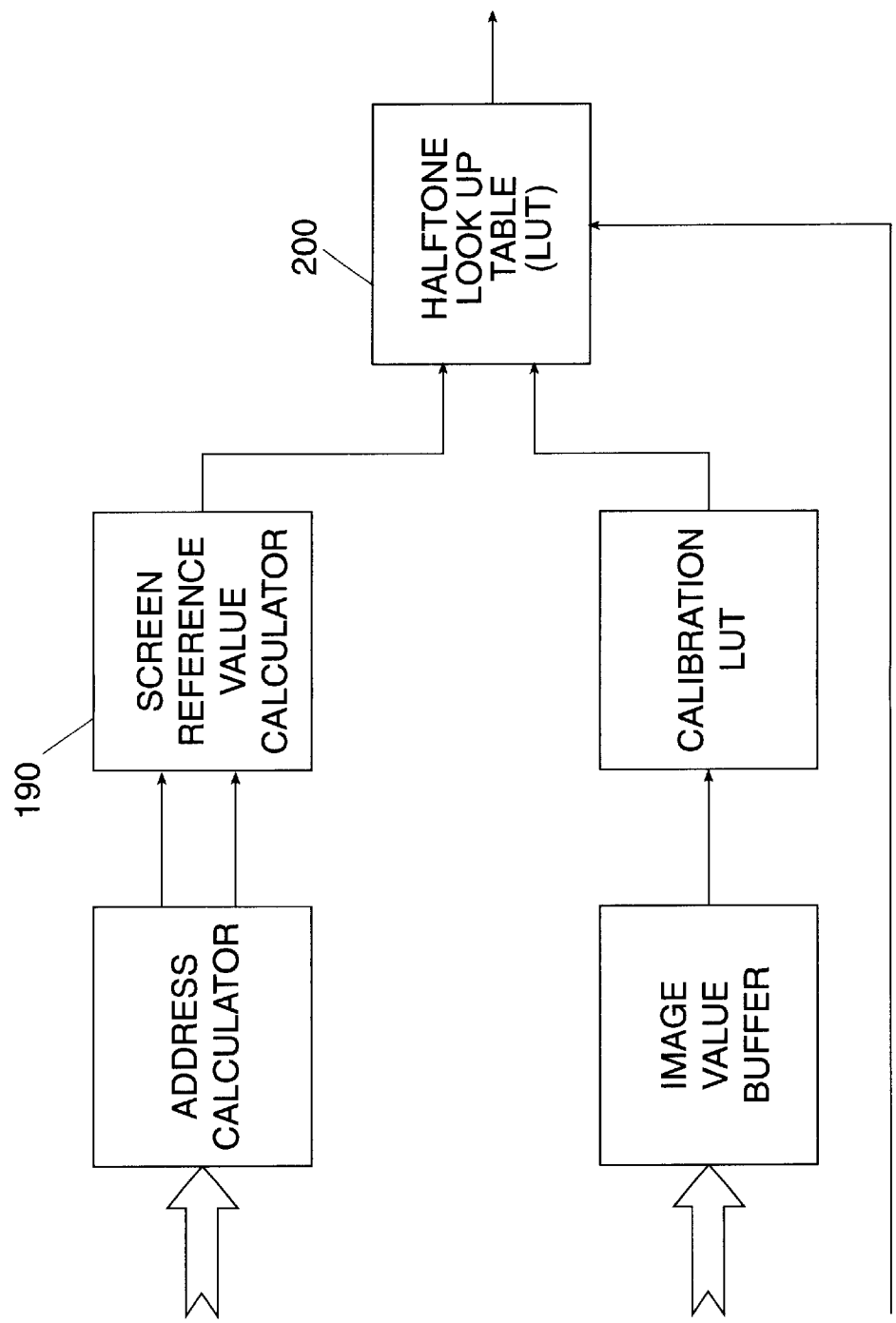
FIG. 7 is a schematic block diagram of a second preferred embodiment of the present invention.

Reference is now made to FIG. 7, which is a schematic block diagram of a second preferred embodiment of the present invention. In this embodiment, a screen reference value calculator 190 replaces the screen reference value matrix 130 of FIG. 5. The screen reference values in this embodiment are calculated on the fly by a screen reference value calculator 190, according to pre-selected and pre-stored functions. The determination of the halftone output data is performed by the halftone LUT 200 that is similar to the halftone LUT 180 of FIG. 5. All the features and advantages that were described in reference to the embodiment of FIG. 5 apply to the embodiment of FIG. 7.

Furthermore, such a system is considered to be even more flexible in terms of the increased variety of different dot shapes that are available to the user.

Figure 8:
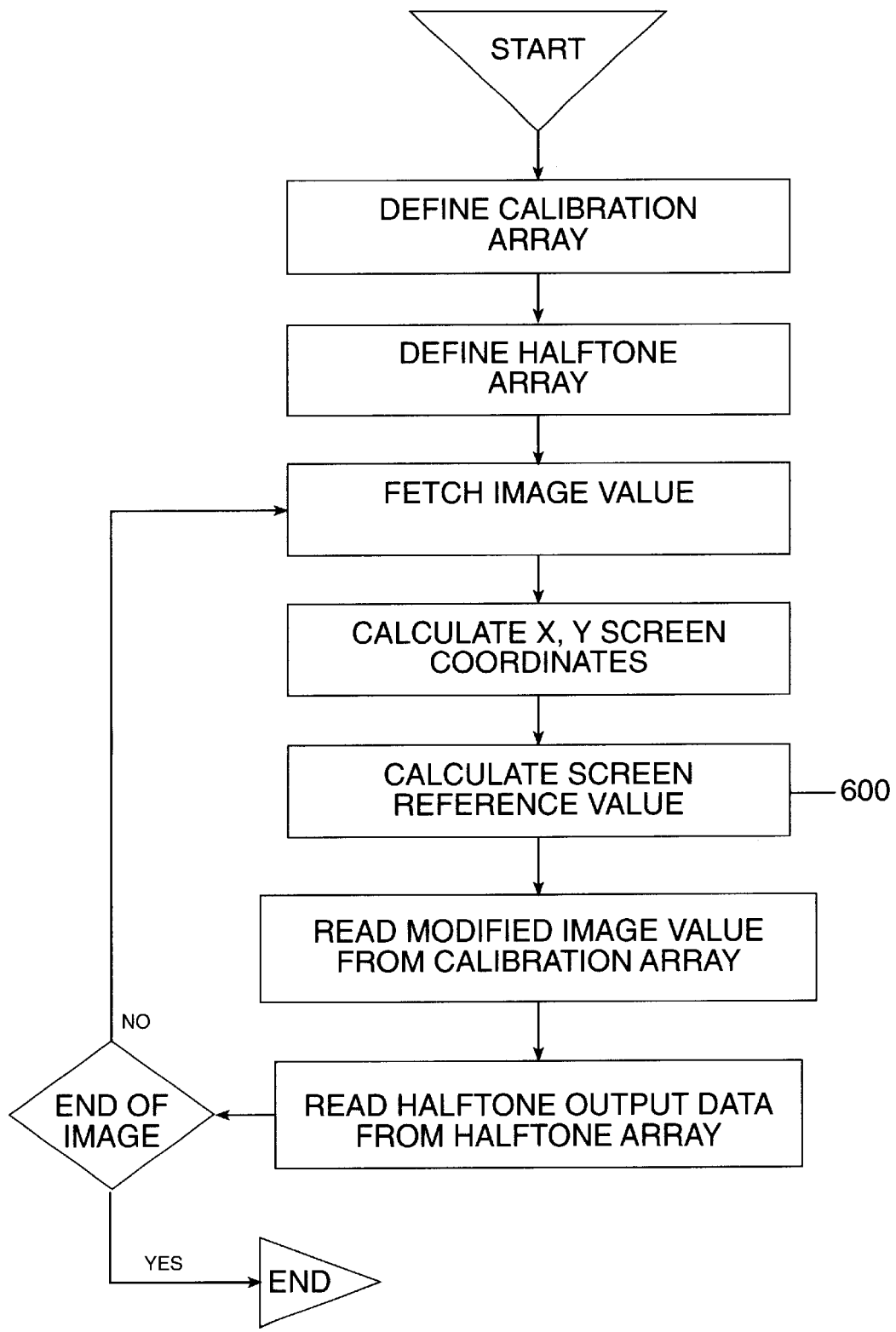
FIG. 8 is a flow chart describing a second software embodiment of the present invention.

Reference is now made to FIG. 8 which is a flowchart describing the operation of the apparatus of FIG. 7. The screen reference values are calculated on the fly, according to pre-selected and pre-stored functions. This is performed in step 600. Therefore, step 600 replaces step 500 of FIG. 6. All other steps of the embodiment of FIG. 8 are similar to those of FIG. 6. It should be noted that new functions may be defined and added to the system whenever desired. This feature enables a larger variety of halftone dot types, which is sometimes important for special jobs.

Figure 9:
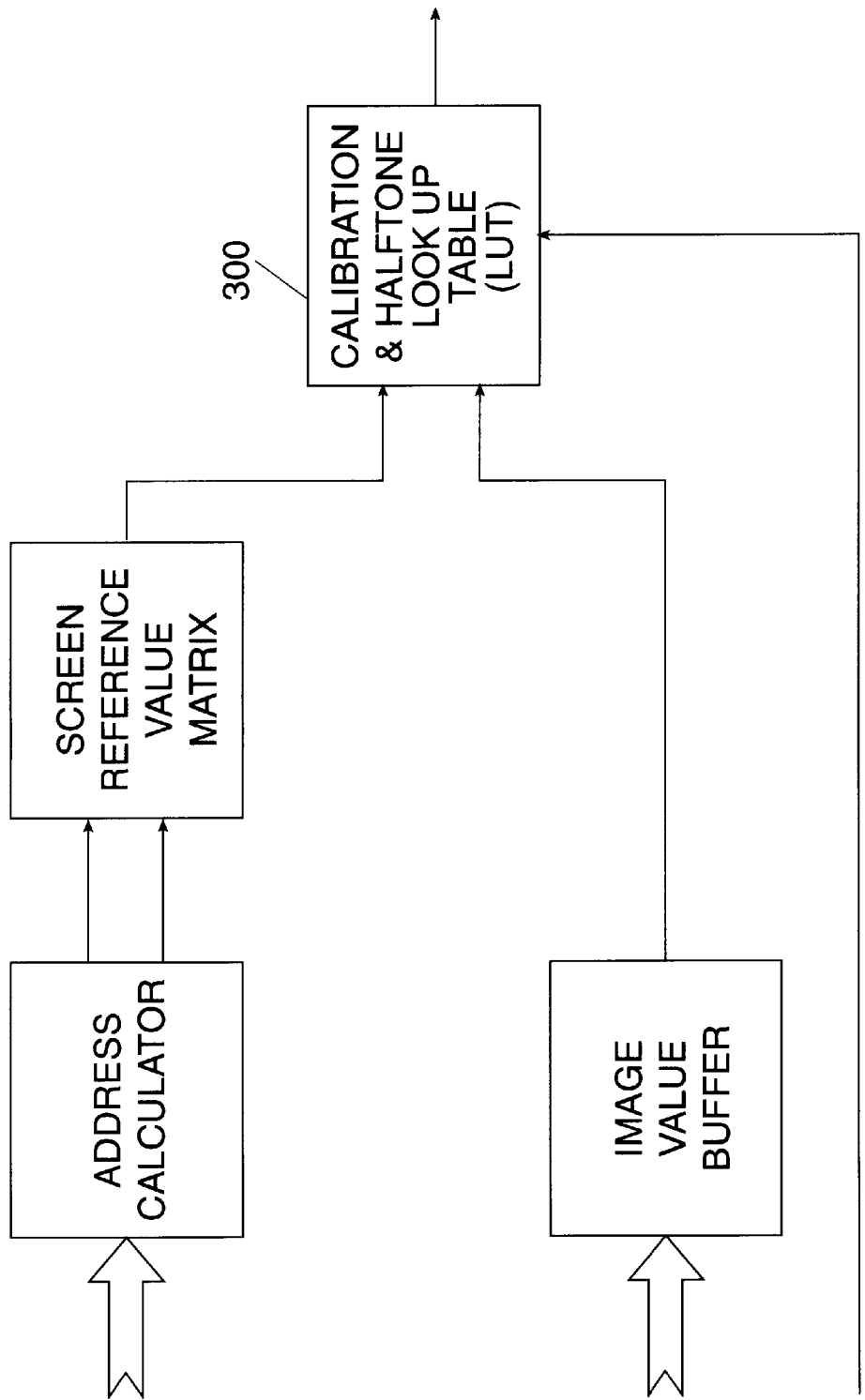
FIG. 9 is a schematic block diagram of a third preferred embodiment of the present invention.

Reference is now made to FIG. 9, which is a schematic block diagram of a third preferred embodiment of the present invention. Functionally, this embodiment is similar to that of FIG. 5. In this embodiment, however, the function of modification (or calibration) of the image values and the function of halftoning are performed concurrently by the calibration and halftone look up table (LUT) 300. This is done by incorporating the required modification (or calibration) changes in the data that is pre-calculated and pre-stored in the LUT 300. It should be noted that the fact that calibration LUT 150 of FIG. 5 does not exist here, may be an important issue in terms of simplicity and performance.

Figure 10:
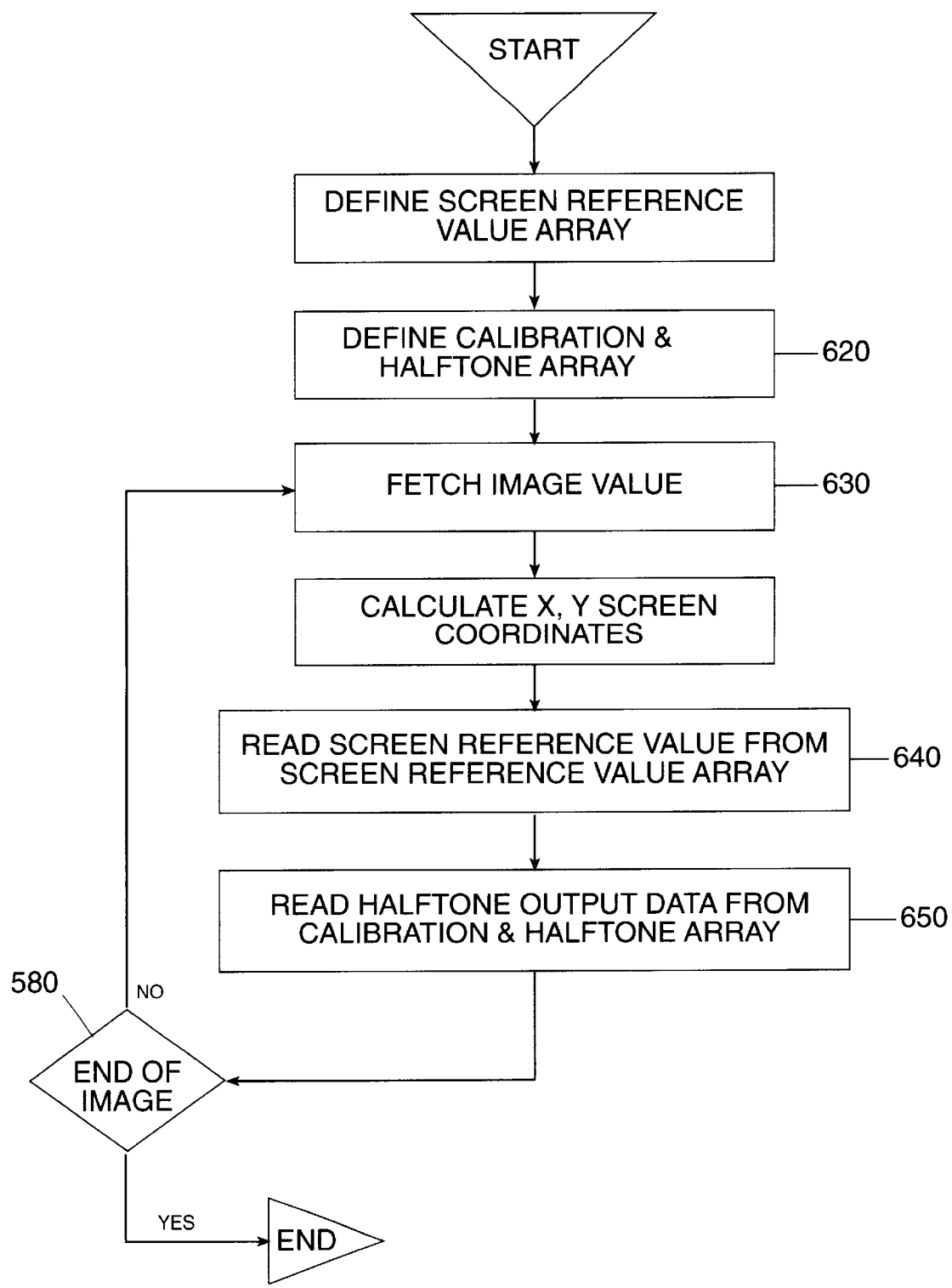
FIG. 10 is a flow chart describing a third software embodiment of the present invention.

Reference is now made to FIG. 10 which is a flowchart describing the operation of the apparatus of FIG. 9. The calibration array of FIG. 6 step 510 is merged with the halftone array and the calibration function is merged with the contents of the halftone data. In step 620, a single calibration and halftone array is defined. In step 630, an image value is fetched. A screen reference value is read in step 640. The combination of image value and screen reference value is used as the address for reading the halftone output data in step 650. An end of image is defined in step 580.

Figure 11:
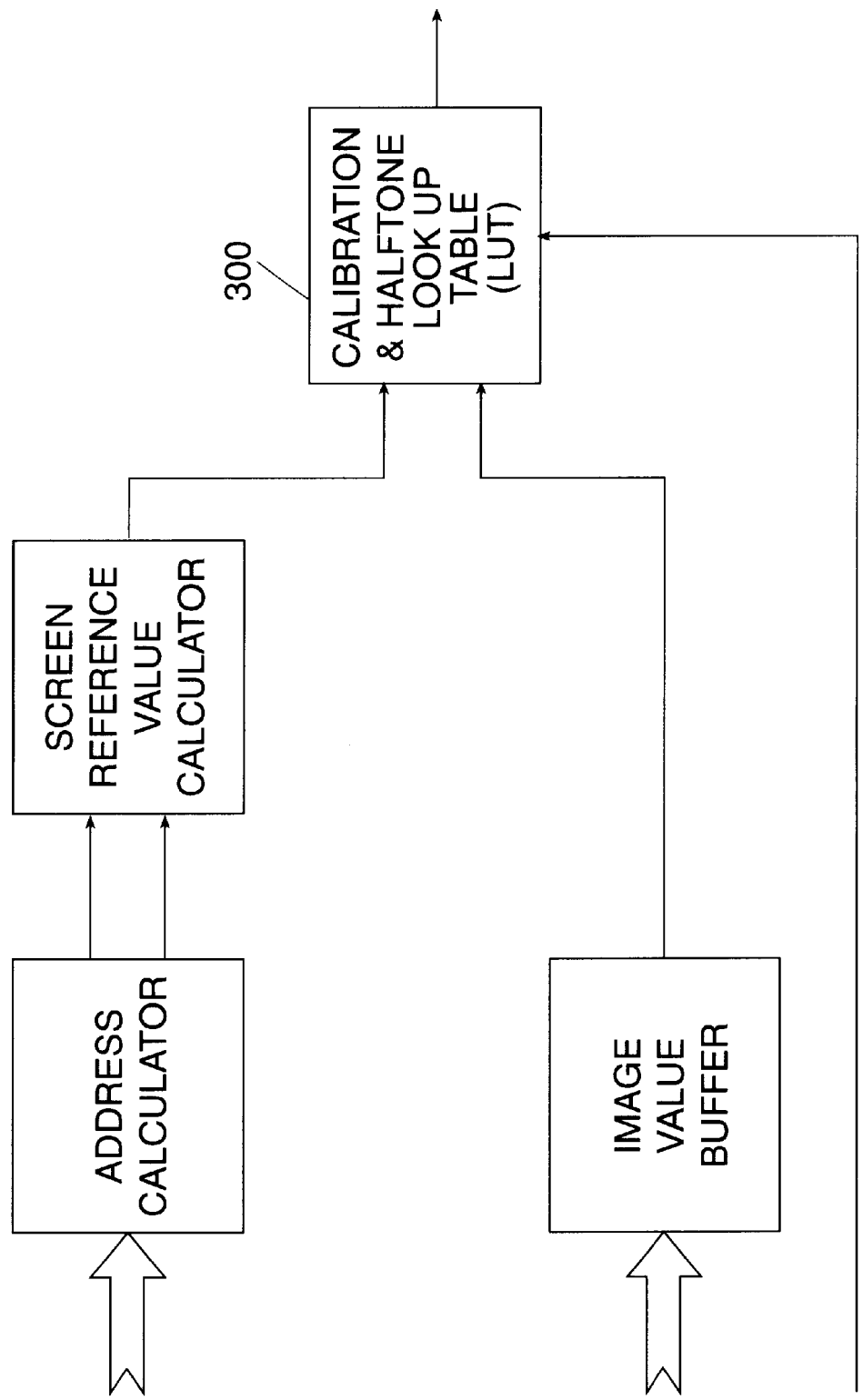
FIG. 11 is a schematic block diagram of a fourth preferred embodiment of the present invention.

Reference is now made to FIG. 11, which is a schematic block diagram of a fourth preferred embodiment of the present invention. Functionally, this embodiment is similar to that of FIG. 7. In this embodiment, however, the function of modification (or calibration) of the image values and the function of halftoning are performed concurrently by the calibration and halftone look up table (LUT) 300.

Figure 12:
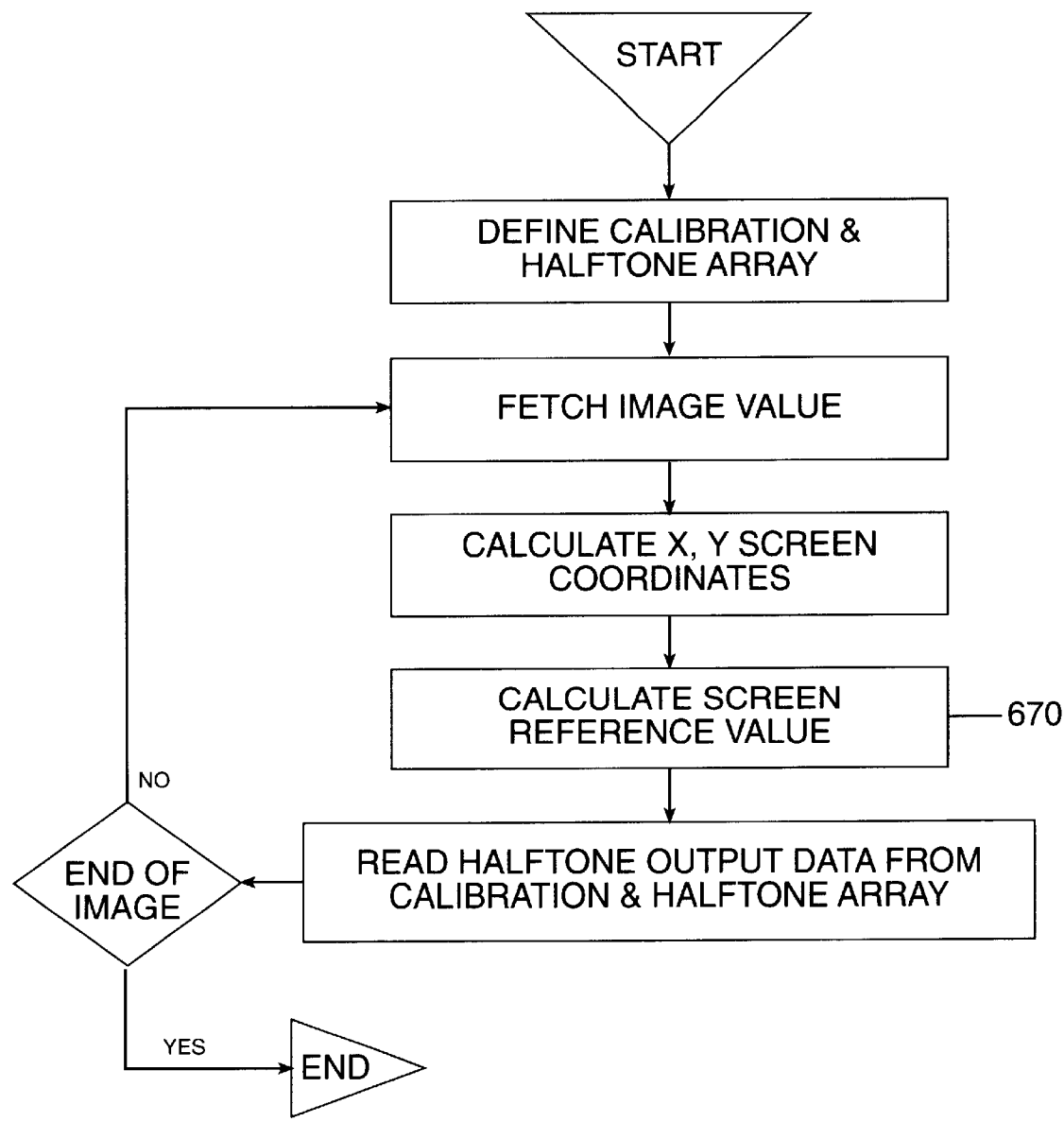
FIG. 12 is a flowchart describing a fourth software embodiment of the present invention.

Reference is now made to FIG. 12 which is a flowchart describing the operation of the apparatus of FIG. 11. In step 670, the screen reference values are calculated, by pre-defined formulas, on the fly. Therefore, any array for storing these values is not used as in the embodiment of FIG. 10. All other steps are similar to the steps in the embodiment of FIG. 10.

Figure 13:
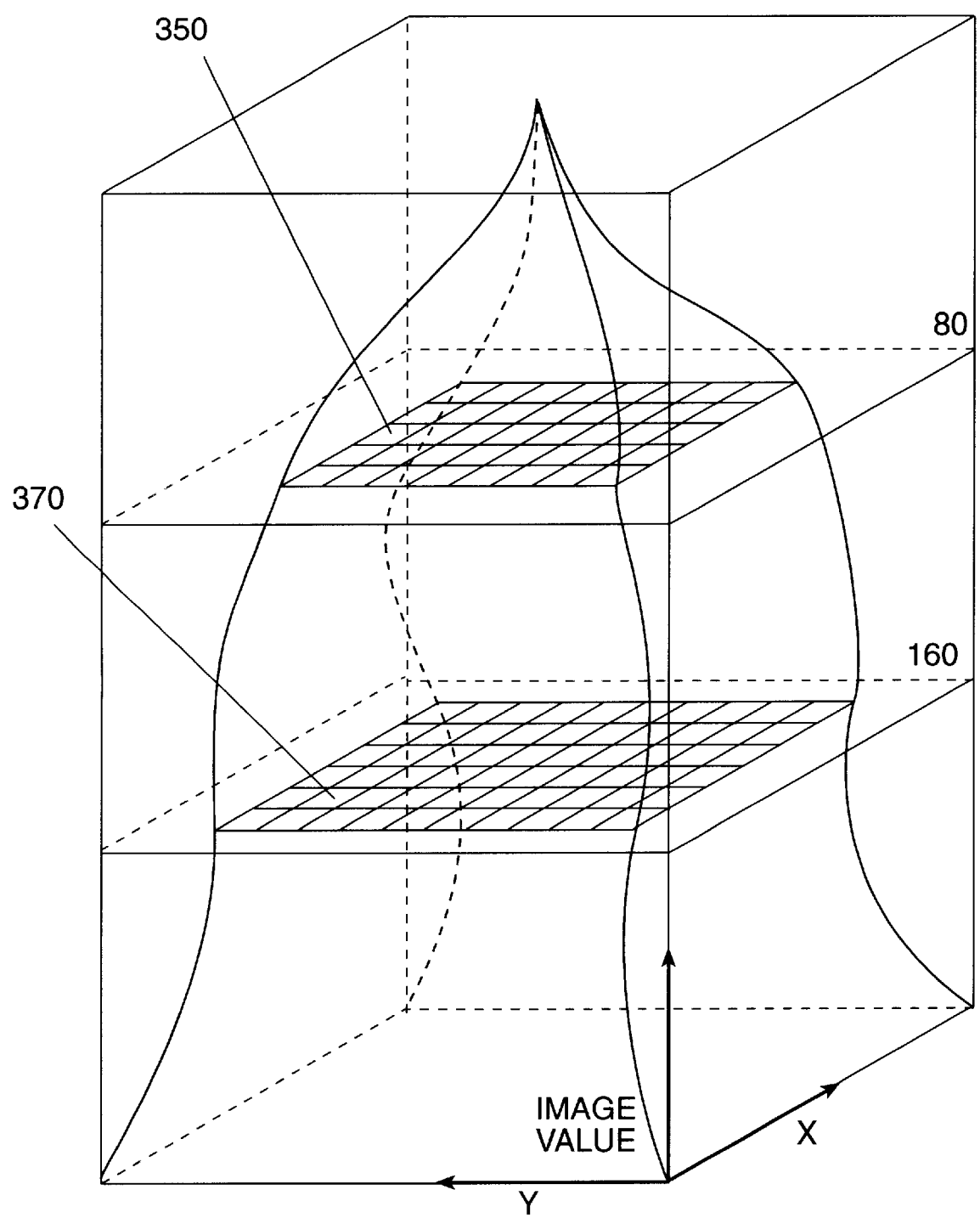
FIG. 13 is a schematic three-dimensional view of a set of halftone dots of any of the embodiments of the present invention.

Reference is now made to FIG. 13, which is a schematic three-dimensional view of a set of halftone dots that may be composed by any one of the preferred embodiments of the present invention. The three dimensional scheme demonstrates the various halftone dot shapes and sizes that correspond to different image values. In this example, the larger the image values the larger the size of the halftone dot. As demonstrated, the halftone dot 370, which corresponds to image value 160, is bigger in size than the halftone dot 350, which corresponds to image value 80. This is a typical example of halftone dot shape and size characteristics. Such halftone dots may be created by any one of the embodiments of the present invention, as well as by all prior art systems described hereinabove.

Figure 14:
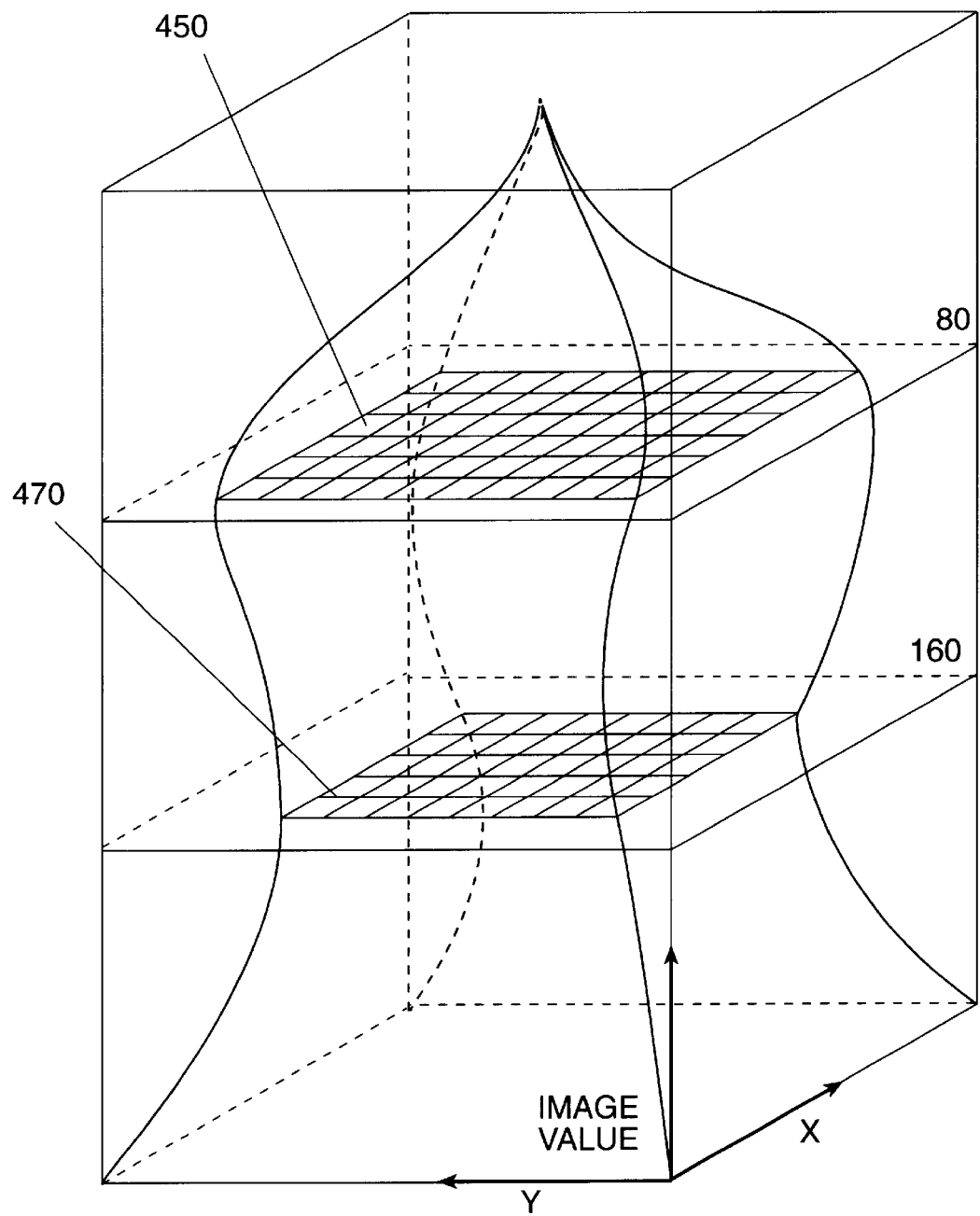
FIG. 14 is a schematic three-dimensional view of another set of halftone dots of any of the embodiments of the present invention.

Reference is now made to FIG. 14, which is a schematic three-dimensional view of another set of halftone dots that may be composed by any one of the embodiments of the present invention. The three dimensional scheme demonstrates the various halftone dot shapes and sizes that correspond to different image values. In this example, however, for larger image values the corresponding halftone dot size may be smaller. As demonstrated, halftone dot 470, which corresponds to image value 160, is smaller in size than halftone dot 450, which corresponds to smaller image value 80. This is another example of halftone dot shape and size characteristics. Such halftone dots may be created by any one of the embodiments of the present invention, and by the embodiment of FIG. 4. The prior art system of FIG. 1, however, is not capable of creating such halftone dots.

It will be appreciated by persons skilled in the art that the present invention is not limited by what has been particularly shown and described herein above. Rather the scope of the invention is defined by the claims that follow.

I claim:

1. A method for producing halftone images, which comprises the steps of:

providing pairs of image coordinates defining addresses in a digital image or a part thereof;

deriving a screen reference value from each said coordinate pair;

providing the image intensity values of said digital image corresponding to said addresses; and deriving a halftone value from each pair of image intensity value and the corresponding screen reference value, wherein said halftone value is predefined for each said pair of image intensity value and corresponding screen reference value, wherein said step of deriving a screen reference value comprises using a first transformation module to receive the coordinate pairs and derive from each said coordinate pair a screen reference value, and wherein said step of deriving a halftone value comprises using a second transformation module to receive said screen reference values and said image intensity values and derive a halftone value therefrom, and wherein said second transformation module is a two-dimensional matrix.

2. Method according to claim 1, wherein the first transformation module is a two-dimensional matrix.

3. Method according to claim 1, wherein the first transformation module is a calculator, operable to perform arithmetic operations.

4. Method according to claim 1, wherein the first transformation module is a look-up table.

5. Method according to claim 1, further comprising calibrating the digital image intensity values.

6. Method according to claim 1, further comprising calibrating the digital image intensity values before they are received by the second transformation module.

7. Method according to claim 1, further comprising calibrating the digital image intensity values in the second transformation module.

8. The method according to any one of claims 1, 2–4 and 5–7, and wherein the digital image intensity values comprise one bit and the halftone values comprise one bit.

9. The method according to any one of claims 1, 2–4 and 5–7 and wherein the digital image intensity values comprise more than one bit and the halftone values comprise one bit.

10. The method according to any one of claims 1, 2–4 and 5–7 and wherein the halftone values comprise more than one bit and the digital image intensity values comprise one bit.

11. The method according to any one of claims 1, 2–4 and 5–7 and wherein the halftone values comprise more than one bit and the digital image intensity values comprise more than one bit.

12. Apparatus for producing a halftone image, which comprises:

storage means for storing digital image intensity values, each corresponding to an image address;

first transformation means for receiving image coordinates defining image addresses and deriving therefrom a screen reference value for each said address; and second transformation means for receiving said screen reference values from said first transformation means, receiving corresponding digital image values from said storage means; and deriving a halftone value from each reference value and the corresponding digital image value, wherein said halftone value is predefined for each pair of said image intensity value and said corresponding screen reference value, and wherein the second transformation means is a two-dimensional matrix.

13. Apparatus according to claim 12, wherein the first transformation means is a two-dimensional matrix.

14. Apparatus according to claim 12, wherein the first transformation means is a calculator, operable to perform arithmetic operations.

15. Apparatus according to claim 12, wherein the first transformation means is a look-up table.

16. Apparatus according to claim 12, further comprising calibration means for receiving said digital image values and providing modified values to be fed to the second transformation means.

17. Apparatus according to claim 12 and wherein the digital image intensity values comprise one bit and the halftone values comprise one bit.

18. Apparatus according to claim 12 and wherein the digital image intensity values comprise more than one bit and the halftone values comprise one bit.

19. Apparatus according to claim 12 and wherein the halftone values comprise more than one bit and the digital image intensity values comprise one bit.

20. Apparatus according to claim 12 and wherein the halftone values comprise more than one bit the digital image intensity values comprise more than one bit.

21. Apparatus according to claim 12, wherein said second transformation means includes calibration means.

* * * * *